United States Patent
Harikae

(10) Patent No.: US 10,780,746 B2
(45) Date of Patent: Sep. 22, 2020

(54) PNEUMATIC TIRE

(71) Applicant: THE YOKOHAMA RUBBER CO., LTD., Minato-ku, Tokyo (JP)

(72) Inventor: Shinya Harikae, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 16/496,751

(22) PCT Filed: Mar. 26, 2018

(86) PCT No.: PCT/JP2018/012006
§ 371 (c)(1),
(2) Date: Sep. 23, 2019

(87) PCT Pub. No.: WO2018/181112
PCT Pub. Date: Oct. 4, 2018

(65) Prior Publication Data
US 2020/0031176 A1 Jan. 30, 2020

(30) Foreign Application Priority Data
Mar. 27, 2017 (JP) .................. 2017-061184

(51) Int. Cl.
*B60C 15/04* (2006.01)
*B60C 15/05* (2006.01)

(52) U.S. Cl.
CPC .............. *B60C 15/05* (2013.01); *B60C 15/04* (2013.01); *B60C 2015/046* (2013.01)

(58) Field of Classification Search
CPC .. B60C 15/04; B60C 2015/046; B60C 9/0028
See application file for complete search history.

(56) References Cited

U.S. PATENT DOCUMENTS

| 7,682,274 | B2 * | 3/2010 | Akiyama | .................. F16G 1/28 474/260 |
| 2005/0091960 | A1 * | 5/2005 | Akiyama | ................. D02G 3/48 57/222 |
| 2010/0000652 | A1 * | 1/2010 | Tresoldi | ............... D07B 1/0613 152/540 |

(Continued)

FOREIGN PATENT DOCUMENTS

| JP | S58-61603 U | * | 4/1983 |
| JP | S64-16901 U | | 1/1989 |

(Continued)

*Primary Examiner* — Robert C Dye
(74) *Attorney, Agent, or Firm* — Carrier Blackman & Associates, P.C.; Joseph P. Carrier; William D. Blackman

(57) ABSTRACT

A pneumatic tire is provided that can achieve performance that is equivalent to or higher than that of known tires while allowing weight reduction of bead cores by using, for the bead cores, a composite cord. A pneumatic tire includes annular bead cores (5) embedded in bead portions (3), and a carcass layer (4) locked on the bead cores (5). Each of the bead cores (5) includes a cable bead structure in which a composite cord (10) is spirally wound around an annular core body (20), the composite cord including a core wire (11) formed of carbon fibers and a plurality of siding wires (12) formed of glass fibers disposed around the core wire (11).

16 Claims, 4 Drawing Sheets

(56) References Cited

U.S. PATENT DOCUMENTS

| | | | |
|---|---|---|---|
| 2013/0248076 A1 | 9/2013 | Maus et al. | |
| 2015/0122394 A1* | 5/2015 | Huyghe | D02G 3/40 |
| | | | 152/547 |
| 2015/0174968 A1* | 6/2015 | Huyghe | D07B 1/062 |
| | | | 152/540 |

FOREIGN PATENT DOCUMENTS

| | | | |
|---|---|---|---|
| JP | H03-161541 A | 7/1991 | |
| JP | 2005-530935 A | 10/2005 | |
| JP | 2008-542099 A | 11/2008 | |
| JP | 4295763 B2 | 7/2009 | |
| JP | 2010-510124 A | 4/2010 | |
| JP | 2013-535583 A | 9/2013 | |
| JP | 5367582 B2 | 12/2013 | |
| JP | 2015-518795 A | 7/2015 | |
| JP | 2015-523475 A | 8/2015 | |
| JP | 2016011736 A | 1/2016 | |
| WO | 80/02572 A1 | 11/1980 | |
| WO | 2004/090224 A1 | 10/2004 | |

* cited by examiner

PNEUMATIC TIRE

TECHNICAL FIELD

The present invention relates to a pneumatic tire including annular bead cores embedded in bead portions and a carcass layer locked on the bead cores and more specifically relates to a pneumatic tire capable of achieving performance that is equivalent to or higher than that of known tires while allowing weight reduction of the bead cores by using, for the bead cores, a composite cord formed of a material other than metal.

BACKGROUND ART

Pneumatic tires generally include a carcass layer mounted between a pair of bead portions. Annular bead cores are embedded in the respective bead portions, and the carcass layer is turned up around the bead cores from a tire inner side to a tire outer side and locked on the bead cores.

In the related art, as the bead cores of the pneumatic tire, multilayer beads are used that are formed by continuously and lamellarly winding one or more steel wires along the tire circumferential direction or cable beads are used that are formed by spirally winding, around an annular core body formed of a steel wire, a siding wire formed of another steel wire. Such bead cores are members assuming an important role in firmly fitting the bead portions of the pneumatic tire on a rim and holding the carcass layer subjected to tension based on an internal pressure.

In recent years, there has been a demand to reduce the mass of the bead cores in order to achieve weight reduction of the pneumatic tire. In view of such a demand, for the bead cores, the use of a wire formed of a material other than metal, for example, carbon fibers, has been proposed (see, for example, Patent Documents 1 to 5).

However, in a case where the wire formed of a material other than metal is used for the bead cores, for example, when the pneumatic tire is mounted on the rim, the wire constituting the bead cores may buckle locally. The buckling may reduce the strength of the bead cores, leading to rupture of the bead cores. Additionally, even in a case where the wire of the bead cores has a sufficient strength, the bead cores may be broken due to stress concentration in a case where the elongation of the bead cores at break is small. Thus, it is presently difficult to put, to practical use, a pneumatic tire in which a wire formed of a material other than metal is used for the bead cores.

Furthermore, a configuration of rubber reinforcing cords used for belts or tires has been proposed in which the rubber reinforcing cords include carbon fiber strands and glass fiber strands disposed around the carbon fiber strands (for example, see Patent Documents 6 and 7). However, these documents do not suggest that the rubber reinforcing cords as described above be applied to the specific members of the bead cores, and the documents teach no specific requirements for application to the bead cores.

CITATION LIST

Patent Literature

Patent Document 1: JP 64-16901 U
Patent Document 2: JP 2008-542099 T
Patent Document 3: JP 2010-510124 T
Patent Document 4: JP 2015-518795 T
Patent Document 5: JP 2015-523475 T
Patent Document 6: JP 4295763 B
Patent Document 7: JP 5367582 B

SUMMARY OF INVENTION

Technical Problem

An object of the present invention is to provide a pneumatic tire capable of achieving performance that is equivalent to or higher than that of known tires while allowing weight reduction of the bead cores by using, for the bead cores, a composite cord formed of a material other than metal.

Solution to Problem

To achieve the object described above, a pneumatic tire according to an embodiment of the present invention is a pneumatic tire including annular bead cores embedded in bead portions, and a carcass layer locked on the bead cores, wherein each of the bead cores has a cable bead structure in which a composite cord is spirally wound around an annular core body, the composite cord including a core wire including carbon fibers and a plurality of siding wires including glass fibers disposed around the core wire.

Advantageous Effects of Invention

In the embodiment of the present invention, as a constituent material of the bead core, the composite cord is used that includes the core wire including the carbon fibers and the plurality of siding wires including the glass fibers disposed around the core wire. Thus, with the high strength feature of the carbon fibers taken advantage of, fatigue resistance, which is poor in the carbon fibers, can be improved based on the arrangement of the siding wires including the glass fibers, and the weight of the bead core can be reduced.

For the employment, for the bead core, of the composite cord including the carbon fibers and glass fibers and having a small elongation at break as described above, the present inventors conducted diligent research on the properties of the bead core. The present inventors then found that, in a case where a multilayer bead structure is employed that includes such a composite cord continuously and lamellarly wound along the tire circumferential direction, a burst pressure of the bead portion is not substantially changed even with an increase in the number of windings. In other words, in a pneumatic tire in which a carcass layer is turned up from a tire inner side to a tire outer side around a bead core having a multilayer bead structure, tension is highest in a circumferential portion of the bead core located on an innermost side in the tire axial direction and on an innermost side in the tire radial direction. The circumferential portion located on the innermost side in the tire axial direction and on the innermost side in the tire radial direction is preferentially broken before the other circumferential portions of the composite cord carries tension. Thus, the burst pressure of the bead portion is prevented from being increased even in a case where the number of windings is increased.

Thus, in the present invention, in connection with the use, for the bead core, of the composite cord having a small elongation at break as described above, a cable bead structure is employed in which the composite cord is spirally wound around an annular core body. In this case, the position of the composite cord in the bead core varies along the tire circumferential direction, and thus stress concentration on the composite cord is avoided, and the entire composite cord carries tension. As a result, the necessary burst pressure can be ensured based on the thickness and the number of windings of the composite cord. Accordingly, performance can be achieved that is equivalent to or higher than that of known tires while the weight of the bead core is reduced by using, for the bead core, the composite cord formed of a material other than metal.

In the embodiment of the present invention, preferably, a total cross-sectional area of the carbon fibers in the composite cord is from 20% to 80% of a sum of the total cross-sectional area of the carbon fibers and a total cross-sectional area of the glass fibers in the composite cord. Accordingly, the strength and fatigue resistance of the composite cord can be ensured.

The core body includes a metal material or a non-metal material. Preferably, the core body is an annular body having a circular cross-sectional shape and a diameter of 1 mm or more, and a material for the core body preferably has a tensile elastic modulus of 1 GPa or higher and a melting point of 200° C. or higher. In a case where the core body includes a metal material, the effect of weight reduction is slightly reduced, but the uniformity of the pneumatic tire is advantageously improved. On the other hand, in a case where the core body includes a non-metal material, the effect of weight reduction can be maximized.

Preferably, the siding wires included in the composite cord are covered with a film having adhesion to rubber. By enhancing the adhesiveness of the composite cord to rubber based on the film covering the siding wire, durability of the bead core can be improved. Additionally, in the composite cord, the film may be peripherally covered with rubber.

Preferably, the composite cord is configured as a twisted cord including a core wire and a plurality of siding wires spirally wound around the core wire, and the composite cord has a cable twist count (the number of times the siding wires are wound around the core wire) of 2 to 10 times/10 cm. Additionally, before the core wire and the siding wires included in the composite cord are intertwined, each of the core wire and the siding wires may be primarily twisted. The number of primary twists is preferably 10 or less times/10 cm for the core wire and preferably from 1 to 20 times/10 cm for the siding wires. In a case where the wires are primarily twisted more times, the composite cord is easily elongated, and this is not preferable. The direction of the primary twists may be identical to the direction of final twists. However, the direction of the primary twists and the direction of the final twists may be identical in terms of buckling resistance and may be opposite in terms of form stability of the composite cord.

Preferably, a winding direction of the composite cord around the core body is, in a case where the composite cord is finally twisted, opposite to a final twist direction of the composite cord in view of difficulty in elongation of the bead core. Preferably, the number of times of windings of the composite cord around the core body is from 1 to 4 times/10 cm. In a case where the composite cord is wound to form two or more layers, the winding direction of the composite cord is preferably identical to that of the first layer, and the number of windings is preferably, in terms of durability, such that the layers have a substantially identical twisting angle.

Preferably, a base surface of the bead portion is provided with two-stage inclination angle including different inclination angles with respect to the tire axial direction, and the inclination angle of a second inclined surface on a bead toe side is larger than the inclination angle of a first inclined surface on a bead heel side. The composite cord has lower tensile rigidity than steel wires, and thus with the composite cord, the bead portion tends to be less firmly fitted on the rim. In contrast, by imparting a two-stage taper as described above to the base surface of the bead portion, the rim can be more firmly fitted on the rim, with high mountability on the rim maintained. Accordingly, a synergistic effect of improving steering stability while achieving weight reduction is also obtained.

DESCRIPTION OF EMBODIMENTS

Figure 1:
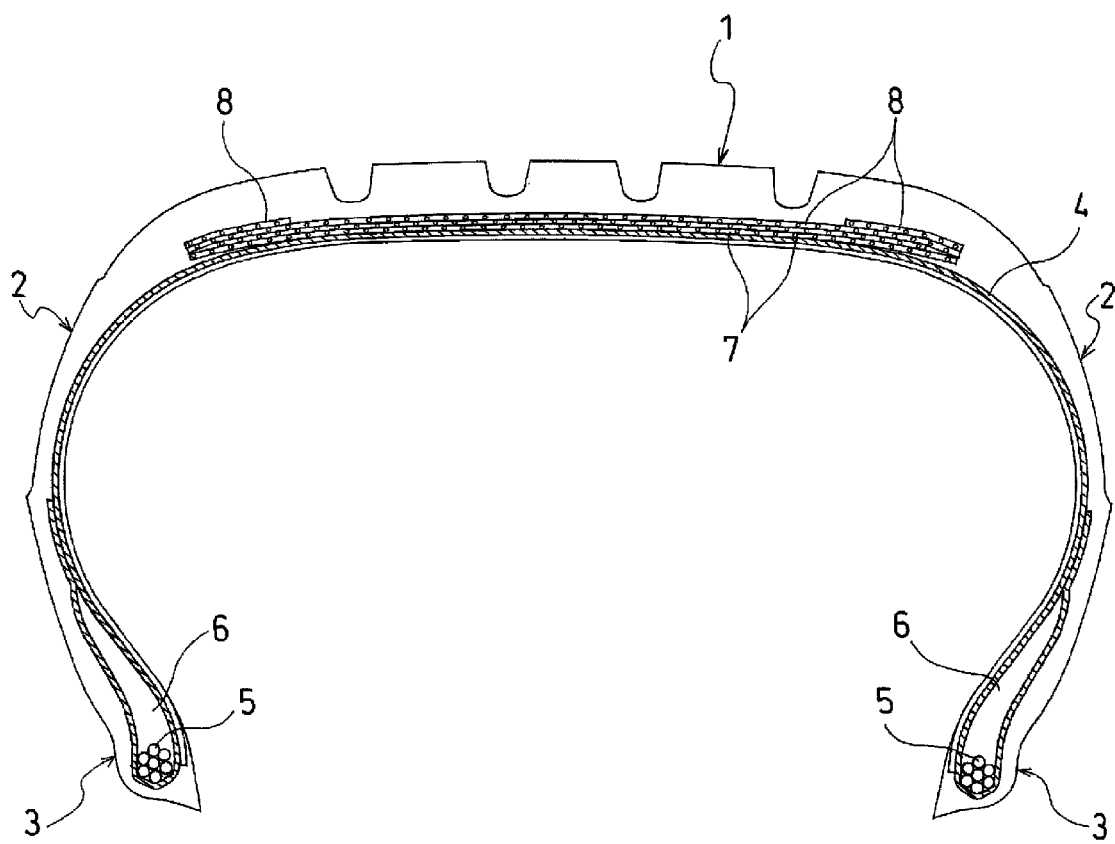
FIG. 1 is a meridian cross-sectional view illustrating a pneumatic tire according to an embodiment of the present invention.

Configurations of embodiments of the present invention will be described in detail below with reference to the accompanying drawings. FIG. 1 illustrates a pneumatic tire according to an embodiment of the present invention.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3,3. The carcass layer 4 includes a plurality of reinforcing cords extending in the tire radial direction and is folded back around bead cores 5 disposed in each of the bead portions 3 from a tire inner side to a tire outer side. As the reinforcing cords constituting the carcass layer 4, organic fiber cords of nylon, polyester, or the like are preferably used. A bead filler 6 having a triangular cross-sectional shape formed from rubber composition is disposed on the outer circumference of the bead core 5.

A plurality of belt layers 7 are embedded on the outer circumferential side of the carcass layer 4 in the tread portion 1. The belt layers 7 each include a plurality of reinforcing cords that are inclined with respect to the tire circumferential direction, with the reinforcing cords of the different layers arranged in a criss-cross manner. In the belt layers 7, the inclination angle of the reinforcing cords with respect to the tire circumferential direction ranges from, for example, 10° to 40°. As the reinforcing cords constituting the belt layers 7, highly elastic cords such as steel cords or aramid cords. On an outer circumferential side of the belt layers 7, at least one belt cover layer 8 that is formed by arranging reinforcing cords at an angle of, for example, 5° or smaller with respect to the tire circumferential direction is disposed in order to improve high-speed durability. The belt cover layer 8 desirably has a jointless structure in which a strip material that is formed of at least a single reinforcing cord laid out and covered with rubber is wound continuously in the tire circumferential direction. As the reinforcing cords constituting the belt cover layer 8, organic fiber cords of nylon, polyester, or aramid are preferably used.

Figure 2:
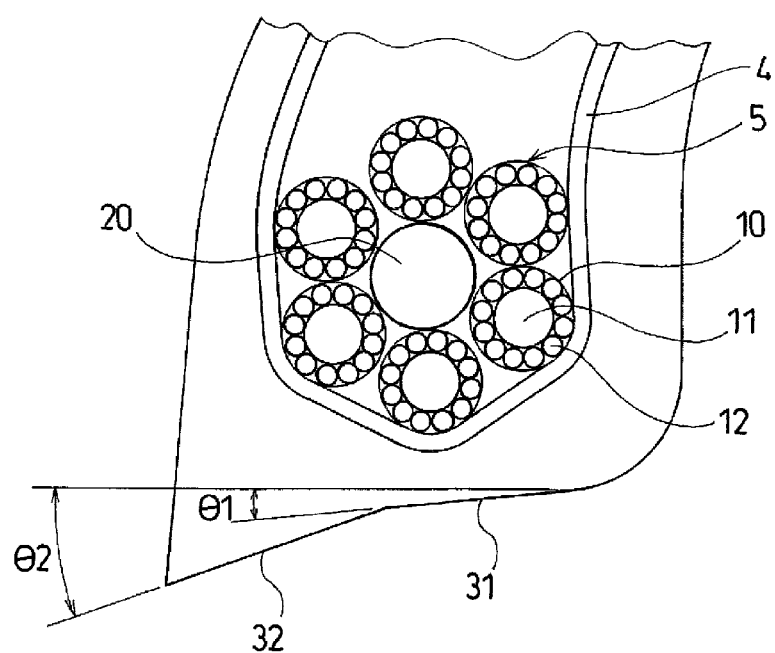
FIG. 2 is a cross-sectional view illustrating an example of a bead core in a pneumatic tire according to an embodiment of the present invention.
Figure 3:
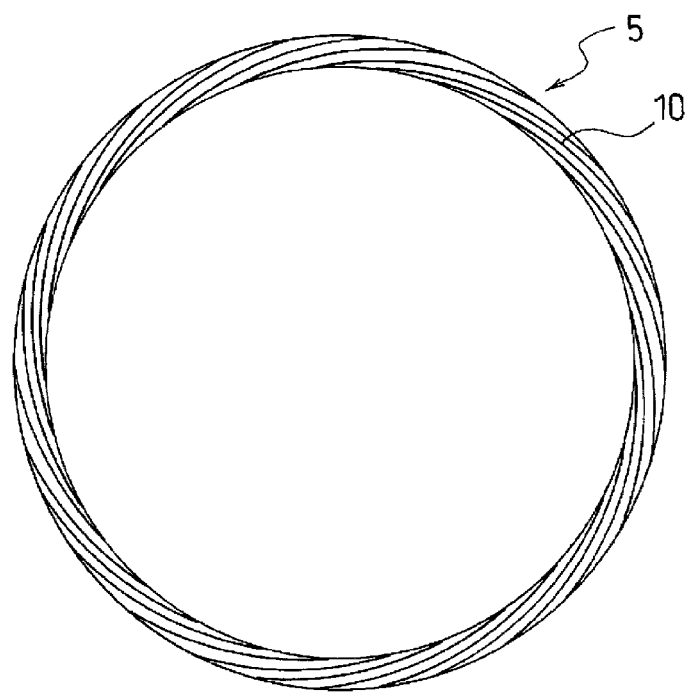
FIG. 3 is a side view illustrating the bead core in the pneumatic tire according to the embodiment of the present invention.

As described above, in a pneumatic tire provided with the annular bead cores 5 embedded in the bead portions 3 and the carcass layer 4 locked on the bead cores 5, an annular body having a cable bead structure in which the composite cord 10 is spirally wound around an annular core body 20 is used as the bead core 5, as illustrated in FIGS. 2 and 3. Namely, in each of the bead cores 5, one composite cord 10 is spirally wound around the annular core body 20 a plurality of times to form side portions. In FIG. 2, a single layer side portion made of the composite cord 10 is formed, but a multilayer side portion may be formed around the core body 20. Additionally, both terminals of the composite cord 10 can be coupled together, for example, via a crimping member.

The winding direction of the composite cord 10 around the core body 20 is, in a case where the composite cord 10 is finally twisted, opposite to the final twist direction of the composite cord 10 in view of difficulty in elongation of the bead core 5. The number of times the composite cord 10 is wound around the core body 20 may be from 1 to 4 times/10 cm. Accordingly, the bead core 5 can have appropriate strength, with stress concentration on the composite cord 10 avoided. In a case where the composite cord 10 is wound to form two or more layers, the winding direction of the layers preferably coincides with the winding direction of the first layer.

Figure 4:
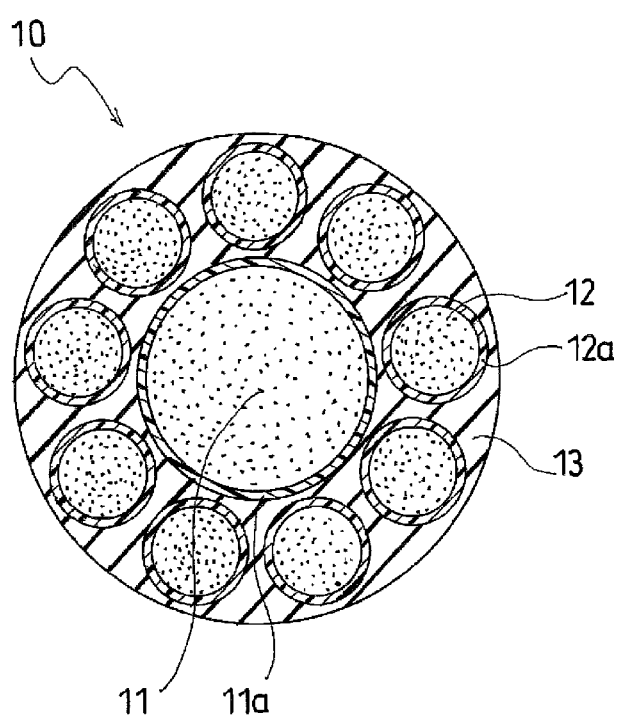
FIG. 4 is a cross-sectional view illustrating a composite cord used for the bead core in the pneumatic tire according to the embodiment of the present invention.

As illustrated in FIG. 4, the composite cord 10 includes at least one core wire 11 formed of carbon fibers, and a plurality of siding wires 12 formed of glass fibers disposed around the core wire 11.

The core wire 11 of the carbon fiber disposed in the center portion of the composite cord 10 has the property of imparting high tensile strength and excellent dimensional stability to the composite cord 10. Obtaining the composite cord 10 with high bending fatigue resistance requires a structure that alleviates tensile stress and compressive stress in a case where the composite cord 10 and insulation rubber for the composite cord 10 bend. The siding wire 12 of glass fibers has a lower elastic modulus and high wear resistance than the core wire 11 of carbon fibers. By enclosing the core wire 11 of carbon fibers with the siding wire 12 of such glass fiber, tensile stress and compressive stress can be alleviated, and thus the composite cord 10 with high bending fatigue resistance is obtained.

The core wire 11 of carbon fibers suitably has a tensile elastic modulus ranging from 155 to 650 GPa. The core wires 11 of carbon fibers has a density of, for example, from 1.74 to 1.97 g/cm$^3$. In particular, the core wire 11 of 30 to 2000 tex is suitably used that is formed by bundling from 500 to 25000 carbon filaments with a diameter of from 4 μm to 8 μm.

Preferably, the total cross-sectional area of the core wire 11 of carbon fibers ranges from 20 to 80% of the sum of the total cross-sectional area of the core wire 11 of carbon fibers and the total cross-sectional area of the siding wires 12 of glass fibers. The core wire 11 of carbon fibers disposed on the center side of the composite cord 10 contributes to high tensile strength and excellent dimensional stability. However, in a case where the rate of the core wire 11 of carbon fibers in the composite cord 10 is excessively high, static strength is improved, but flexibility may be degraded. Thus, the total cross-sectional area of the core wire 11 of carbon fibers is preferably 80% or less, and more preferably 70% or less, of the sum of the total cross-sectional area of the core wire 11 of carbon fibers and the total cross-sectional area of the siding wires 12 of glass fibers. On the other hand, in a case where the rate of the core wire 11 of carbon fibers in the composite cord 10 is excessively low, the effect of the core wire 11 of carbon fibers may fail to be sufficiently obtained. Thus, the total cross-sectional area of the core wire 11 of carbon fibers is preferably 20% or more, and more preferably 40% or more of the sum of the total cross-sectional area of the core wire 11 of carbon fibers and the total cross-sectional area of the siding wires 12 of glass fibers.

The core wire 11 of carbon fibers may be twisted or may not be twisted. The number of twists of the core wire 11 of carbon fibers is preferably 10 or less times to 10 cm.

Additionally, the surface of the core wire 11 of carbon fibers may be treated to improve adhesiveness or to prevent fibers from fraying. For example, a film 11a having adhesion to rubber may be formed on the surface of the core wire 11 of carbon fibers. Such a film 11a can be formed using, for example, a treatment liquid (RFL treatment liquid) mainly based on a mixture of an initial condensate of resorcin and formalin and a rubber latex. As the initial condensate of resorcin and formalin, a known such condensate is applicable. For example, a resol type condensate can be used that is obtained by reacting resorcin and formaldehyde in the presence of an alkaline catalyst, or a novolac type condensate can be used that is obtained by reacting resorcin and formaldehyde in the presence of an acid catalyst. Additionally, an epoxy compound, an isocyanate compound, or the like may be used to treat the surface of the core wire 11 of carbon fibers to improve adhesiveness.

The siding wires 12 of glass fibers suitably have an elastic modulus of 60 to 80 GPa. The siding wires 12 of glass fibers have a density of, for example, approximately 2.5 g/cm$^3$ and a tensile strength of, for example, 250 to 310 cN/dtex. As the siding wires 12 of glass fibers, strands are preferably used that are obtained by bundling and primarily twisting from 200 to 2400 glass filaments with a diameter of, for example, from 7 to 9 μm, the strands each having a thickness ranging from 20 to 480 tex. Additionally, the number of the siding wires 12 of glass fibers disposed around the core wire 11 of carbon fibers is not particularly limited, but preferably, for example, from 5 to 24 siding wires, and preferably from 8 to 15 siding wires.

The siding wires 12 of glass fibers are disposed on the outer circumferential side of the composite cord 10, and thus the adhesion of the siding wires 12 to the insulation rubber in which the composite cord 10 is embedded is important. The adhesion of the siding wires 12 of glass fibers to the insulation rubber can be improved by treating the siding wires 12 of glass fibers to improve adhesiveness or by twisting the siding wire 12 of glass fibers.

A film 12a having adhesion to rubber may be formed on the surface of each of the siding wires 12 of glass fibers. Such a film 12a can be formed using, for example, a treatment liquid (RFL treatment liquid) mainly based on a mixture of a condensate of resorcin and formalin and a rubber latex. In this case, the bending fatigue resistance of the siding wires 12 of glass fibers can be improved, and the adhesion of the siding wires 12 of glass fibers to rubber can be improved. Additionally, an adhesive may be applied to the surface of each of the siding wires 12 of glass fibers. For example, an epoxy compound, an isocyanate compound, or the like may be used to treat the surface of each of the siding wires 12 of carbon fibers to improve adhesiveness.

The siding wires 12 of glass fibers may be primarily twisted such that the number of twists ranges from 1 to 20 times/10 cm. Setting the number of twists in this range allows the bending fatigue resistance to be improved. In a case where the siding wires 12 of glass fibers are primarily twisted, the composite cord 10 is desirably finally twisted in the direction opposite to the primary twist direction of the siding wires 12 of glass fibers. This enables untwisting to be reduced. In a case where the composite cord 10 is finally twisted, the number of final twists preferably ranges from 2 to 10 times/10 cm.

A cover rubber layer 13 may be formed on the surface of the composite cord 10. The cover rubber layer 13 can be selected depending on the insulation rubber in which the composite cord 10 is embedded. Note that the films 11a and 12a and the cover rubber layer 13 can be omitted.

In the pneumatic tire configured as described above, as a constituent material of the bead core 5, the composite cord 10 is used that includes the core wire 11 formed of carbon fibers and the plurality of siding wires 12 formed of glass fibers disposed around the core wire 11. Thus, with the high strength feature of the carbon fibers taken advantage of, fatigue resistance, which is poor in the carbon fibers, can be improved based on the arrangement of the siding wires including the glass fibers, and the weight of the bead core 5 can be reduced.

Additionally, in connection with the use of the composite cord 10 for the bead core, a cable bead structure is employed in which the composite cord 10 is spirally wound around the annular core body 20. In this case, the position of the composite cord 10 in the bead core 5 varies along the tire circumferential direction, and thus stress concentration on the composite cord 10 is avoided, and the entire composite cord 10 carries tension. As a result, the necessary burst pressure can be ensured based on the thickness and the number of windings of the composite cord 10. Accordingly, performance can be achieved that is equivalent to or higher than that of known tires while the weight of the bead core 5 is reduced by using, for the bead core 5, the composite cord 10 formed of a material other than metal.

In the pneumatic tire described above, the siding wires 12 constituting the composite cord 10 may be coated with the film 12a having adhesion to rubber, and the composite cord 10 may be covered with the rubber layer 13. In particular, when the bead core 5 is manufactured, the composite cord 10 is desirably covered with unvulcanized rubber. By improving the adhesion of the composite cord 10 to rubber based on the film 12a covering the siding wire 12 as described above, the durability of the bead core 5 can be improved.

In the pneumatic tire described above, the annular core body 20 disposed at the center position of a cross section of the bead core 5 can be formed of a metal material or a non-metal material. In a case where the core body 20 is formed of a metal material, the effect of weight reduction is slightly reduced, but the uniformity of the pneumatic tire is advantageously improved. Examples of the metal material of the core body 20 include steel and aluminum. Such a metal material may have a tensile elastic modulus of 1 GPa or higher and a melting point of 200° C. or higher. In particular, the core body 20 may be an annular body formed of a metal rod. In a case where the core body 20 is formed of a metal material, the core body 20 may have a diameter of 1 mm or more.

On the other hand, in a case where the core body 20 is formed of a non-metal material, the effect of weight reduction can be maximized. An example of the non-metal material of the core body 20 is a synthetic resin such as nylon. Such a non-metallic material may have a tensile elastic modulus of 1 GPa or higher and a melting point of 200° C. or higher. In particular, the core body 20 may be an annular body formed of a resin rod. Such a synthetic resin can be compounded with reinforcing short fibers. In a case where the core body 20 includes a non-metallic material, the core body 20 may have a diameter of 1 mm or more. Additionally, the composite cord 10 described above can be used to form an annular body, which can be used as the core body 20.

Furthermore, as illustrated in FIG. 2, preferably, a base surface of the bead portion 3 is provided with two-stage inclination angle including different inclination angles with respect to the tire axial direction, and the inclination angle $\theta 2$ of a second inclined surface 32 on a bead toe side is larger than the inclination angle $\theta 1$ of a first inclined surface 31 on a bead heel side. For example, the inclination angle $\theta 1$ of the first inclined surface 31 on the bead heel side can be set to range from 5° to 10°, while the inclination angle $\theta 2$ of the second inclined surface 32 on the bead toe side can be set to range from 12° to 25°. The composite cord 10 has lower tensile rigidity than steel wires, and thus with the composite cord 10, the bead portion 3 tends to be less firmly fitted on the rim. In contrast, in a case where a two-stage taper as described above is imparted to the base surface of the bead portion 3, the relatively small inclination angle $\theta 1$ of the first inclined surface 31 on the bead heel side allows high mountability on the rim to be maintained, while the relatively large inclination angle $\theta 2$ of the second inclined surface 32 on the bead toe side causes the bead toe side of the bead portion 3 to be strongly compressed at the time of fitting to allow the bead portion 3 to be more firmly fitted on the rim. Thus, steering stability can be improved while weight reduction is achieved.

EXAMPLE

Tires according to Conventional Example 1, Comparative Examples 1 and 2, and Examples 1 to 3 were manufactured. The tires are pneumatic tires having the same configuration including annular bead cores embedded in bead portions and a carcass layer locked on the bead cores, except for the structure of the bead cores, the tires each having a tire size of 205/55R16.

In Conventional Example 1, bead cores having a multi-layer bead structure with a hexagonal cross section are employed, and steel wires are used for the bead cores. In Comparative Example 1, bead cores having a multilayer bead structure with a hexagonal cross section are employed, and as wires for the bead cores, composite cords are used that include a core wire formed of carbon fibers and a plurality of siding wires formed of glass fibers disposed around the core wire. In Comparative Example 2, bead cores having a cable bead structure are employed, and as wires for a core body and a side portion of each bead core, carbon fiber cords are used.

In Example 1, bead cores having a cable bead structure are employed, and as wires for a core body and a side portion of each bead core, composite cords are used that include a core wire formed of carbon fibers and a plurality of siding wires formed of glass fibers disposed around the core wire. In Example 2, bead cores having a cable bead structure are employed, and as wires for a core body of each bead core, steel wires are used, and as wires for a side portion of the bead core, composite cords are used that include a core wire formed of carbon fibers and a plurality of siding wires formed of glass fibers disposed around the core wire. In Example 3, bead cores having a cable bead structure are employed, and as wires for a core body of each bead core, nylon wires are used, and as wires for a side portion of the bead core, composite cords are used that include a core wire formed of carbon fibers and a plurality of siding wires formed of glass fibers disposed around the core wire. The multilayer structure of the bead core, the number of windings, and the diameter of the wire are set as indicated in Table 1.

With regard to the multilayer structure of the bead core, in the case of a multilayer bead, for example, "4+5+4" means that circumferential portions of the wire are layered in the order of four rows, five rows, and four rows from the inner side toward the outer side in the tire radial direction. Additionally, in the case of a cable bead, for example, "1+6+12" means that a side portion formed of six circumferential rows is disposed around one core body, and another side portion formed of 12 circumferential rows is disposed outside the side portion.

For the tires according to Conventional Example 1, Comparative Examples 1 and 2, and Examples 1 to 3, the total strength of the bead cores, the mass of the bead cores, the burst pressure in a brand-new state, and the burst pressure after durability tests are evaluated using the following test method, and the results are indicated in Table 1.

Total Strength of Bead Cores

The total strength of the bead cores used in each of the test tires is measured and expressed as an index value, with Conventional Tire 1 being assigned as an index value of 100. A larger index value means a higher total strength of the bead cores.

Mass of Bead Cores

The mass of the bead cores used in each of the test tires is measured and expressed as an index value, with Conventional Tire 1 being assigned as an index value of 100. A larger index value means a larger mass of the bead cores.

Burst Pressure in Brand-New State

Each test tire is fixed in a hydraulic testing device, the pressure inside the tire is increased, and the maximum pressure at which the bead portions are broken is determined. Evaluation results are expressed as index values, with the results of Conventional Example 1 being assigned as an index value of 100. A larger index values means a higher tensile at break in a brand-new tire.

Burst Pressure after Durability Test

After a load durability test specified in JIS-D4230 is performed on each test tire, the test tire is fixed in a hydraulic testing device, the pressure inside the tire is increased, and the maximum pressure at which the bead portions are broken is determined. Evaluation results are expressed as index values, with the results of Conventional Example 1 being assigned as an index value of 100. A larger index value means a higher tensile at break in a tire subjected to the durability test.

TABLE 1

|  | Conventional Example 1 | Comparative Example 1 | Comparative Example 2 | Example 1 | Example 2 | Example 3 |
|---|---|---|---|---|---|---|
| Type of bead core | Multilayer bead | Multilayer bead | Cable Bead | Cable Bead | Cable Bead | Cable Bead |
| Wires for bead core | Steel | Carbon/glass | Carbon fibers | Core body: carbon/glass Side portion: carbon/glass | Core body: steel Side portion: carbon/glass | Core body: nylon Side portion: carbon/glass |
| Multilayer structure of bead core | 4 + 5 + 4 | 4 + 5 + 6 + 5 + 4 | 1 + 6 + 12 | 1 + 6 + 12 | 1 + 6 + 12 | 1 + 6 + 12 |
| Twist direction of carbon fiber/glass fiber composite cord (carbon primary twist/glass primary twist/final twist) | — | S/Z/S | — | S/Z/S | S/Z/S | S/Z/S |
| Number of twists of carbon fiber/glass fiber composite cord (carbon primary twist/glass primary twist/final twist) (times/10 cm) | — | 2/8/7 | — | 2/8/7 | 2/8/7 | 2/8/7 |
| Winding direction of cable bead side portion (First layer/second layer) | — | — | Z/Z | Z/Z | Z/Z | Z/Z |

TABLE 1-continued

|  | Conventional Example 1 | Comparative Example 1 | Comparative Example 2 | Example 1 | Example 2 | Example 3 |
| --- | --- | --- | --- | --- | --- | --- |
| Number of windings of cable bead side portion (First layer/second layer) (times/10 cm) | — | — | 2.5/1.3 | 2.5/1.3 | 2.5/1.3 | 2.5/1.3 |
| Number of windings of bead core | 13 | 24 | 19 | 19 | 19 | 19 |
| Diameter of wire (mm) | 1.2 | 1.2 | Core body: 1.4 Side portion: 1.2 | Core body: 1.4 Side portion: 1.2 | Core body: 1.4 Side portion: 1.2 | Core body: 1.4 Side portion: 1.2 |
| Total strength of bead cores (index value) | 100 | 98 | 76 | 76 | 77 | 74 |
| Mass of bead cores (index value) | 100 | 39 | 19 | 25 | 33 | 25 |
| Burst pressure in brand-new state (index value) | 100 | 74 | 102 | 102 | 104 | 100 |
| Burst pressure after durability test (index value) | 100 | 74 | 87 | 102 | 104 | 100 |

As can be seen from Table 1, compared to the tire in Conventional Example 1, the tires in Examples 1 to 3 allow weight reduction to be achieved, while a sufficient tensile at break of the bead portion is maintained. On the other hand, in the tire in Comparative Example 1, as wires for the bead core, a composite cord is used that is formed of carbon fibers and glass fibers, but the bead core has a multilayer bead structure with a hexagonal cross section, preventing a sufficient tensile at break of the bead portion from being ensured. Additionally, in the tire in Comparative Example 2, bead cores having a cable bead structure are employed, but a carbon fiber cord is used as wires for the core body and the side portion, preventing a sufficient tensile at break of the bead portion from being ensured after the durability test. This is because the strength of the carbon fiber cord constituting the bead core is reduced due to damage during traveling.

REFERENCE SIGNS LIST

1 Tread portion
2 Sidewall portion
3 Bead portion
4 Carcass layer
5 Bead core
6 Bead filler
7 Belt layer
8 Belt reinforcing layer
10 Composite cord
11 Core wire
11*a* Film
12 Siding wire
12*a* Film
13 Cover rubber layer
20 Core body

The invention claimed is:

1. A pneumatic tire comprising annular bead cores embedded in bead portions, and a carcass layer locked on the bead cores,
    wherein each of the bead cores comprises a cable bead structure in which a composite cord is spirally wound around an annular core body, the composite cord comprising a core wire comprising carbon fibers and a plurality of siding wires comprising glass fibers disposed around the core wire.

2. The pneumatic tire according to claim 1, wherein a total cross-sectional area of the carbon fibers in the composite cord is from 20% to 80% of a sum of the total cross-sectional area of the carbon fibers and a total cross-sectional area of the glass fibers in the composite cord.

3. The pneumatic tire according to claim 1, wherein the core body is an annular body having a circular cross-sectional shape and a diameter of 1 mm or more, and has a tensile elastic modulus of 1 GPa or higher and a melting point of 200° C. or higher.

4. The pneumatic tire according to claim 1, wherein the core body comprises a metal material.

5. The pneumatic tire according to claim 1, wherein the core body comprises a non-metal material.

6. The pneumatic tire according to claim 1, wherein the siding wires included in the composite cord are covered with a film having adhesion to rubber.

7. The pneumatic tire according to claim 1, wherein the composite cord is configured as a twisted cord comprising a core wire obtained by twisting the carbon fibers 10 or less times/10 cm and a plurality of siding wires spirally wound around the core wire and each of the siding wires obtained by twisting the glass fibers from 1 to 20 times/10 cm.

8. The pneumatic tire according to claim 1, wherein a winding direction of the composite cord around the core body in the bead core is opposite to a final twist direction of the composite cord.

9. The pneumatic tire according to claim 1, wherein a base surface of each of the bead portions is provided with two-stage inclination angle including different inclination angles with respect to a tire axial direction, and the inclination angle of a second inclined surface on a bead toe side is larger than the inclination angle of a first inclined surface on a bead heel side.

10. The pneumatic tire according to claim 2, wherein the core body is an annular body having a circular cross-sectional shape and a diameter of 1 mm or more, and has a tensile elastic modulus of 1 GPa or higher and a melting point of 200° C. or higher.

11. The pneumatic tire according to claim 2, wherein the core body comprises a metal material.

12. The pneumatic tire according to claim 2, wherein the core body comprises a non-metal material.

13. The pneumatic tire according to claim 2, wherein the siding wires included in the composite cord are covered with a film having adhesion to rubber.

14. The pneumatic tire according to claim 2, wherein the composite cord is configured as a twisted cord comprising a core wire obtained by twisting the carbon fibers 10 or less times/10 cm and a plurality of siding wires spirally wound around the core wire and each of the siding wires obtained by twisting the glass fibers from 1 to 20 times/10 cm.

15. The pneumatic tire according to claim 2, wherein a winding direction of the composite cord around the core body in the bead core is opposite to a final twist direction of the composite cord.

16. The pneumatic tire according to claim 2, wherein a base surface of each of the bead portions is provided with two-stage inclination angle including different inclination angles with respect to a tire axial direction, and the inclination angle of a second inclined surface on a bead toe side is larger than the inclination angle of a first inclined surface on a bead heel side.

* * * * *